United States Patent
Somani et al.

(10) Patent No.: US 9,600,257 B2
(45) Date of Patent: *Mar. 21, 2017

(54) APPLICATION INSTALLATION SYSTEM

(71) Applicant: Good Technology Holdings Limited, Waterloo (CA)

(72) Inventors: Haniff Somani, Mercer Island, WA (US); Sean Michael Quinlan, Duvall, WA (US)

(73) Assignee: Good Technology Holdings Limited, Waterloo, ON (CA)

( * ) Notice: Subject to any disclaimer, the term of this patent is extended or adjusted under 35 U.S.C. 154(b) by 47 days.

This patent is subject to a terminal disclaimer.

(21) Appl. No.: 14/724,606

(22) Filed: May 28, 2015

(65) Prior Publication Data

US 2015/0261515 A1   Sep. 17, 2015

Related U.S. Application Data

(63) Continuation of application No. 13/277,051, filed on Oct. 19, 2011, now Pat. No. 9,110,750.

(51) Int. Cl.
*G06F 9/44*        (2006.01)
*G06F 9/445*       (2006.01)
(Continued)

(52) U.S. Cl.
CPC ............... *G06F 8/60* (2013.01); *G06F 8/61* (2013.01); *G06F 21/51* (2013.01);
(Continued)

(58) Field of Classification Search
CPC ..... G06F 8/60; G06F 8/61; G06F 8/65; G06F 21/51; G06F 21/6218; G06F 9/44505;
(Continued)

(56) References Cited

U.S. PATENT DOCUMENTS

| | | |
|---|---|---|
| 5,555,416 A | 9/1996 | Owens et al. |
| 6,064,656 A | 5/2000 | Angal et al. |

(Continued)

FOREIGN PATENT DOCUMENTS

| | | | | |
|---|---|---|---|---|
| CA | EP 2725513 A1 * | 4/2014 | ........... | G06F 21/604 |
| WO | 2008025514 A1 | 3/2008 | | |

OTHER PUBLICATIONS

NTFS.com, "Permission Precedence," May 9, 2009, last retrieved from http://www.ntfs.com/ntfs-permissions-precedence.htm on Oct. 17, 2016.*

(Continued)

*Primary Examiner* — Wei Zhen
*Assistant Examiner* — Andrew M Lyons
(74) *Attorney, Agent, or Firm* — Fish & Richardson P.C.

(57) ABSTRACT

A method, system and computer program product for generating a list of applications available for installation on a user terminal is disclosed. In one aspect, a catalogue server identifies a first and a second installation control setting corresponding to an application on the basis of user identification data from a data store comprising entries for a plurality of applications and their corresponding installation control settings. Subsequently, the catalogue server determines installation control data for at least one of the first and second application on the basis of the first and the second installation control setting. The determined installation control data is used to generate the list of application available for installation on the user terminal.

20 Claims, 16 Drawing Sheets

(51) Int. Cl.
*G06F 21/51* (2013.01)
*G06F 21/62* (2013.01)

(52) U.S. Cl.
CPC ........ *G06F 21/6218* (2013.01); *G06F 9/4451* (2013.01); *G06F 9/44505* (2013.01); *G06F 2221/2141* (2013.01)

(58) Field of Classification Search
CPC ........... G06F 9/4451; G06F 2221/2141; H04L 29/08072; H04L 29/08981
USPC .................................................. 717/168–178
See application file for complete search history.

(56) References Cited

U.S. PATENT DOCUMENTS

| | | | |
|---|---|---|---|
| 6,493,871 | B1 | 12/2002 | Welch et al. |
| 7,751,331 | B1* | 7/2010 | Blair ........................ H04L 45/00 370/236 |
| 2004/0002943 | A1 | 1/2004 | Merrill et al. |
| 2005/0262501 | A1 | 11/2005 | Marinelli et al. |
| 2006/0265708 | A1* | 11/2006 | Blanding .................. G06F 8/65 717/174 |
| 2007/0044023 | A1 | 2/2007 | Carter |
| 2009/0249215 | A1 | 10/2009 | Paek |
| 2010/0205284 | A1 | 8/2010 | Newton et al. |
| 2010/0242037 | A1 | 9/2010 | Xie et al. |
| 2011/0010759 | A1 | 1/2011 | Adler |
| 2011/0252415 | A1* | 10/2011 | Ricci ...................... G06Q 10/06 717/173 |
| 2012/0036442 | A1* | 2/2012 | Dare ........................ G06F 8/60 715/736 |
| 2012/0072895 | A1 | 3/2012 | Koyama et al. |
| 2012/0129503 | A1 | 5/2012 | Lindeman |
| 2012/0246738 | A1 | 9/2012 | Shah et al. |
| 2012/0291138 | A1* | 11/2012 | Haga ....................... G06F 21/51 726/27 |
| 2013/0074063 | A1* | 3/2013 | Schwartz ......... G06Q 10/06311 717/174 |
| 2013/0104118 | A1 | 4/2013 | Somani et al. |
| 2014/0208088 | A1 | 7/2014 | Somani et al. |

OTHER PUBLICATIONS

Kit Eaton Apple Patent Reveals Restricted Enterprise App Store Plans: Rim, Beware. 2 pages, http://www.fastcompany.com/1717416/apple-patent-reveals-restricted-enterprise-app- . . . Jan. 14, 2011.
App Store Volume Purchase Program for Business. Apple Inc. 5 pages, 2011.
Distributing Enterprise Apps for iOS 4 Devices. Apple Inc. 8 pages, Mar. 4, 2011.
iPhone OS Enterprise Deployment Guide. Apple Inc. 90 pages, 2010.
AirWatch. 1 page, http:/lwww.air-watch.com/ Oct. 12, 2011.
Information Property List Key Reference. Apple Inc. 72 pages, Jun. 6, 2011.
Forum Discussion re: App settings from BES?—BlackBerry Support Community Forums, now available at https://supportforums.blackberry.com/t5/BlackBerry-Web-Services/App-settings-from-BES/m-p/1390539/highlight/true#M915, Oct. 31, 2011, Mar. 22, 2012 and Mar. 23, 2012 (as indicated). 7 pages.
"Custom Application Control Policies and How to Use Them", BlackBerry Connection Newsletter—IT Editon, http://www.blackberry.com/newsletters/connection/it/i610/control_policies.shtml, Jun. 1, 2010, 4 pages.
International Search Report and Written Opinion of the International Searching Authority Issued Jan. 7, 2013 in PCT/US2012/061040.
Eric Chong et al., "Using the System Installation Tool Kit to Streamline Client Rollout," IBM, Nov. 2001.

* cited by examiner

| AppID | UserID | Installation Control Setting |
|---|---|---|
| Application A | User A | ALLOW |
| Application B | User A | DENY |
| ... | ... | ... |

300

| | 302 | 304 | 306 |
|---|---|---|---|
| | AppID | UserID | Installation Control Setting A |
| | Application A | User A | ALLOW |
| | Application A | User B | ALLOW |
| | Application A | User C | CONTINUE |
| | Application A | User D | FORCE |
| | Application A | User E | ALLOW |
| | Application B | User A | DEFAULT |
| | ... | ... | ... |

320

| | 322 | 324 | 326 |
|---|---|---|---|
| | AppID | UserID | Installation Control Setting B |
| | Application A | User A | ALLOW |
| | Application A | User B | FORCE |
| | Application A | User C | SUSPEND |
| | Application A | User D | DENY |
| | Application A | User E | DEFAULT |
| | Application B | User A | DEFAULT |
| | ... | ... | ... |

Figure 5

| EnterpriseID | PartnerID | App |
|---|---|---|
| Enterprise A | Provider A | Application A |
| Enterprise A | Provider A | Application B |
| Enterprise A | Provider A | Application C |
| Enterprise B | Provider A | Application A |
| Enterprise B | Provider A | Application D |
| Enterprise B | Provider A | Application E |
| ... | ... | ... |

| AppID | UserID | Installation Control Setting A |
|---|---|---|
| Application A | Everyone in Enterprise A | Demo |
| Application A | Everyone in Enterprise B | Demo |
| Application A | Everyone in Enterprise C | Demo |
| Application A | Everyone in Enterprise D | Demo |
| Application A | Everyone in Enterprise E | Demo |
| Application B | Everyone in Enterprise A | Allow |
| ... | ... | ... |

1702 — AppID
1704 — UserID
1706 — Installation Control Setting A

1720

| AppID | UserID | Installation Control Setting B |
|---|---|---|
| Application A | Trial Group Enterprise A | ALLOW |
| Application A | Non trial Group Enterprise A | Deny |
| Application B | Everyone in Enterprise A | Allow |
| ... | ... | ... |

1722 — AppID
1724 — UserID
1726 — Installation Control Setting B

Figure 12

| AppID | VersionID | UserID | Installation Control Setting |
|---|---|---|---|
| Application A | Version 1 | User A | ALLOW |
| Application A | Version 2 | User A | DENY |
| Application A | Version 1 | User B | SUSPEND |
| Application A | Version 2 | User B | ALLOW |
| Application A | Version 1 | User C | CONTINUE |
| Application A | Version 2 | User C | FORCE |
| Application A | Version 1 | User D | CONTINUE |
| Application A | Version 2 | User D | ALLOW |
| Application A | Version 1 | User E | ALLOW |
| Application A | Version 2 | User E | ALLOW |
| Application A | Version 1 | User F | DENY |
| Application A | Version 2 | User F | DENY |
| Application A | Version 1 | User G | FORCE |
| Application A | Version 2 | User G | FORCE |
| ... | ... | ... | ... |

Figure 17

APPLICATION INSTALLATION SYSTEM

CROSS-REFERENCE TO RELATED APPLICATIONS

This application is a continuation under 35 U.S.C. §120 of U.S. patent application Ser. No. 13/277,051, filed Oct. 19, 2011, the contents of which are incorporated herein by reference in their entirety.

BACKGROUND OF THE INVENTION

The present disclosure relates to the field of software applications for user terminals and provides methods, systems and computer program products for controlling the installation of applications on such terminals.

Application distribution systems may facilitate the distribution of software applications to user terminals. A user may connect to an application portal, such as the Apple® App Store™ or Android™ Marketplace, via their user terminal, whereupon they are presented with a selection of applications available for download and installation. Entitlement to applications may be determined on the basis of whether the user associated with the user terminal has paid for the given application (if necessary). Thus a given user's entitlement to access and download applications is determined on the basis of whether funds have been received for the application. This mechanism does not permit parties such as application providers to control provisioning of applications.

In addition to application provisioning to individual user devices, Application distribution systems may also facilitate bulk distribution of applications. For example, the Apple® B2B App Store™ provides a number of redemption codes for use by individual user devices in downloading of a corresponding application. However, management of redemption codes is cumbersome and error prone.

Enterprises may also maintain their own application distribution systems for distributing applications to user devices connected thereto, in which entitlement to applications is determined on the basis of enterprise provided user or device authentication credentials. However, maintaining enterprise specific application distribution systems is costly. In addition, such enterprise specific application distribution systems may not be compatible with certain devices, such as iPhone®, whose manufacturer insists on controlling application provisioning via their own application distribution systems.

Application distribution systems additionally do not have any mechanisms of managing the persistence of distributed applications, and, as a consequence, enterprises are unable to reuse licenses.

It is an objective of the present disclosure to provide improved methods for controlling the access to applications on user terminals.

SUMMARY

In accordance with aspects of the disclosure, there is provided a method for controlling the installation of applications on a user terminal, on the basis of user identification data for a user associated with said user terminal, according to the appended claims. Some additional features are set out in the dependent claims.

In one exemplary embodiment, there is provided a method for controlling the installation of applications on a user terminal, on the basis of user identification data for a user associated with said user terminal, the method comprising: accessing a data store, said data store comprising entries for a plurality of applications and corresponding installation control settings associated with said plurality of applications; identifying, on the basis of said user identification data, at least a first installation control setting for a first of said plurality of applications; identifying, on the basis of said user identification data, at least a second installation control setting for a second of said plurality of applications; determining installation control data for at least one of said first and second applications on the basis of at least said first installation control setting and at least said second installation control setting; and transmitting an installation control message to control installation of at least one of said first and second applications on said user terminal, said installation control message comprising said installation control data.

In a first arrangement, the first and second installation control settings are associated with the same application and the determined installation control data relates to installation of this same application. An advantage of this exemplary embodiment for this arrangement is that a plurality of different installation control settings can be taken into account when determining the installation control data for a particular user, in relation to a particular application, thereby potentially allowing a number of sources to influence the determination of the installation control data through independent control of the various installation control settings.

For example, entities such as an application developer, enterprise network, equipment manufacturer, wireless services provider, etc., may influence the installation of applications on user devices by specifying installation control settings for the particular application, and these different installation control settings collectively determine the installation control data for the particular application. This provides an advantage over conventional mechanisms, where installation control can only be exercised by means of a redemption code or by provisioning applications from an enterprise specific application distribution system.

Further, since installation control settings can be controlled independently of application provisioning, this embodiment enables installation control after application provisioning.

In a second arrangement, the first and second applications are different and installation control data is therefore generated for one of the first and second applications on the basis of an installation control setting associated with the other of the first and second applications; in this example the installation control data takes account of the respective control settings and can prevent installation of incompatible applications. For example, the installation control data can be generated on the basis of presence of a control settings corresponding to an application that has already been installed on the device (a so-called "pre-existing application"). This embodiment is particularly useful when applications that are available for download originate from a disparate source of software applications, such as the aforementioned list comprising application developer, enterprise network, and where the device is shipped with various pre-existing applications in accordance with installation of the equipment manufacturer.

Advantageously, the first installation control setting may be associated with a first plurality of users, each of the first plurality of users having a common grouping characteristic. The second installation control setting may be associated with a second plurality of users, at least some of which are different to the first plurality of users, each of the second plurality of users having a second common grouping characteristic, different to the first common grouping characteristic. Hence, the installation control settings may be configured for multiple users simultaneously, based on some shared grouping characteristics, such as enterprise associated therewith or users of a given application, and different grouping characteristics may be applied. An application provider may control their installation control setting whereby to allow installation of an application on user devices associated with an enterprise network, who may subsequently control their installation control setting to allow installation of the application on all or some user devices associated therewith, thereby enabling efficient application bulk distribution.

In a further arrangement, the determination of installation control data comprises selecting between at least the first installation control setting and the second installation control setting according to one or more predetermined selection criteria. The one or more predetermined selection criteria may have the effect of one of the installation control settings being selected in preference one or more other installation control settings.

Advantageously, the one or more predetermined selection criteria may tend to select a more restrictive installation control setting. Hence if any installation control setting seeks to restrict access to an application for a given user, then access may be restricted for that user, regardless of whether a different installation control setting would tend to allow access to the same application for the same user. For users that belong to an enterprise, the selection criteria can be specified by the enterprise, in which case, and irrespective of other sources of applications to which the user has subscribed, the enterprise has ultimate control over which applications can be installed on their user devices.

In a yet further arrangement, available settings for the installation control settings include a default setting and one or more further settings, wherein the determination of said installation control data comprises selecting one of the one or more further settings in preference to the default setting if both one of said one or more further settings and the default setting are present in the first installation control setting and the second installation control setting. This feature is particularly well suited to instances in which an installation control setting has not been used to set a preference to the level of access to an application that should be afforded: in this situation, other installation control settings may be considered in preference.

Available settings for said installation control settings may include a default setting and one or more further settings, wherein said determination of said installation control data comprises including installation control data which indicates access is to be denied to a given application if said first installation control setting comprises a default setting and said second installation control setting also comprises a default setting. In this way, it can be ensured that access to a given application should be granted by at least one of the installation control settings in order for the associated user terminal to be able to install the application.

The installation control settings may include at least one of: a setting allowing the user terminal to install an application; a setting denying the user terminal a right to install an application; a setting suspending access to an application if previously installed; a setting continuing access to an application if previously installed; a setting forcing the user terminal to install an application; and a default installation control setting.

The installation control data may include at least one of: a setting allowing the user terminal to install an application; a setting denying the user terminal a right to install an application; a setting suspending access to an application if previously installed; a setting continuing access to an application if previously installed; a setting forcing the user terminal to install an application; and a default installation control setting In response to receiving an installation request message from the user terminal requesting access to an identified application, the method may comprise determining installation control data in relation to said identified application, facilitating installation of said requested application on said user terminal in accordance with said determined installation control data. On the other hand, if a user tries to access an application to which they are not entitled, access to, and installation of, that application may be denied for that user.

The method may comprise monitoring said data store for updates to said installation control settings; identifying one or more updated installation control settings associated with one or more of said plurality of applications; and determining installation control data for one or more of said plurality of applications on the basis of at least said one or more updated installation control settings. Hence if a change is effected in relation to an installation control setting, the corresponding installation control data can be recalculated automatically.

Embodiments may provide efficient version management for applications by means of: maintaining a list of applications installed on said user terminal; comparing said one or more applications having updated installation control settings to said list of applications installed on said user terminal; and transmitting an installation control update message to said user terminal, said installation control update message comprising installation control data generated on the basis of said comparison. Hence, when installation control data is updated for a given application, a message can be sent to any user terminal that is affected by the change. This mitigates the need for the user terminal to poll the data store to determine when a change to the installation control data occurs. Additionally, this arrangement permits a connected entity, such as enterprise networks, to control persistence of installed applications on user devices associated therewith.

In some embodiments, the comparison step comprises identifying, from among said applications having updated installation control data, one or more applications which are listed in said list of applications installed on said user terminal. Hence a user terminal can be informed when the installation control data changes for an application that it has currently installed.

In some embodiments, said installation control update message is configured to cause access to one or more of said identified applications to be terminated on said user terminal. Hence, access to an installed application can be quickly prevented from running on a user terminal after an administrative control role has updated an installation control setting to invoke such a denial of access.

Advantageously, said comparison may comprise identifying, from among said applications having updated installation control data, one or more applications having an updated installation control setting indicating that installation should be forced on said user terminal and which are not listed on said list of applications installed by said user terminal. As a result, installation of an application can for example be quickly forced on a user terminal after an administrative control role has updated an installation control setting to invoke such a forced installation.

The data store may comprise entries for a plurality of versions of one or more of said plurality of applications, and said at least a first and at least a second installation control settings comprise installation control settings associated with said plurality of versions.

In some embodiments, said first installation control setting for a first version of an installed application is configured to deny or suspend access to said first version of said installed application, and said second installation control setting for a second version of said installed application is configured to continue, allow, or force access to said second version of said installed application. As a result, installation control data can be configured to force a user terminal to upgrade to a second version of an application, depending on the combination of installation control settings applied.

Advantageously, said first installation control setting for a first version of an installed application is configured to continue, allow or force access to said first version of said installed application, and said second installation control setting for a second version of said installed application is configured to deny or suspend access to said second version of said installed application. Installation control data can be configured to prevent a user terminal from upgrading to a second version of an application, depending on the combination of installation control settings applied.

In some embodiments, said first installation control setting for a first version of an installed application is configured to continue, allow or force access to said first version of said installed application, and said second installation control setting for a second version of said installed application is configured to continue, allow or force access to said second version of said installed application. In embodiments in which these two installation control settings are used for comparison, said installation control data is configured to allow a user terminal to upgrade to a second version of an application if desired, depending on the combination of installation control settings applied.

Advantageously said first installation control setting for a first version of an installed application is configured to continue, allow or force access to said first version of said installed application, and said second installation control setting, for a second version of said installed application is configured to force installation of said second version of said installed application. Hence, installation control data can be configured to force a user terminal to upgrade to a new version of an application, depending on the combination of installation control settings applied.

By utilizing installation control settings associated with different administrative control roles, some embodiments enable the generation of installation control data, derived from settings made using the different administrative control roles, which governs the installation control relationship between a given user and a given application.

Further exemplary embodiments described herein are concerned with providing a server system and data store configured to interoperate so as to perform the above method, and a computer program, or a suite of computer programs comprising a set of instructions, which, when executed by a server system having access to a database holding user identification data and installation control settings corresponding to different applications, causes the server system to perform the foregoing method steps.

Further features and advantages of embodiments of the invention will become apparent from the following description of some preferred embodiments of the invention, given by way of example only, which is made with reference to the accompanying drawings.

BRIEF DESCRIPTION OF THE DRAWINGS

FIG. 5 shows an illustrative example of two different sets of installation control settings in a catalogue data store database according to some embodiments.

FIG. 11 illustrates exemplary catalogue data store database entries according to some embodiments.

FIG. 12 illustrates exemplary catalogue data store database entries according to some embodiments.

FIG. 17 illustrates a number of exemplary catalogue data store database entries according to some embodiments.

DETAILED DESCRIPTION OF CERTAIN INVENTIVE EMBODIMENTS

Figures 1, 2:
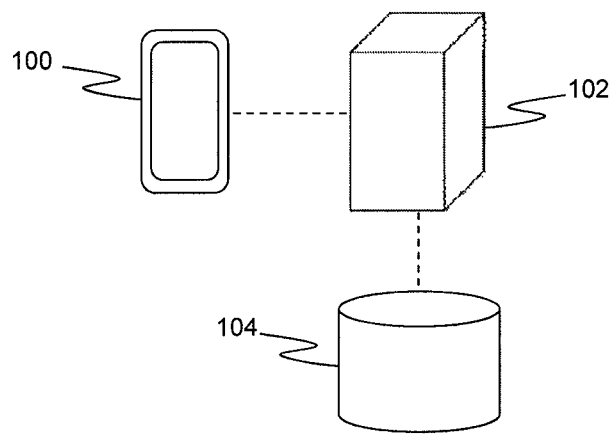
FIG. 1 is a schematic block diagram illustrating the components of an application installation control system according to some embodiments.
FIG. 2 illustrates exemplary catalogue data store database entries according to some embodiments.

Some embodiments of the invention are concerned with controlling installation and/or persistence of applications on user devices. More specifically, some embodiments are concerned with enabling entities connected with user devices or applications to control installation of applications on user devices. The processing involved in application provisioning and installation thereof on user devices is described in detail below, but first an overview of a network environment within which some embodiments of the invention may operate are described with reference to FIG. 1, which shows a block diagram illustrating a user terminal 100 (or user device or device) communicably connected to an application distribution system 102 (hereinafter referred to as catalogue server or application installation control system).

The user terminal 100 may be a portable electronic device comprising conventional hardware and being capable of installing software applications. The user terminal may be a mobile telephony device, such as a smartphone, a portable computer, such as a tablet computer, or a desktop computer. User terminal 100 can communicate with catalogue server 102 in order to browse and download available applications. The communication medium used for communications between the user terminal 100 and catalogue server 102 depends on the capabilities of the user terminal. For example, the user terminal 100 may communicate with network entities such as catalogue server 102 via an internet connection using a packet-based communication protocol such as the Hypertext Transfer Protocol (HTTP). If user terminal 100 is a wireless device, the user terminal 100 may communicate with network entities via a mobile telephony network, for example using a cellular radio link, or via other radio access networks, for example using a WiFi or WiMax radio link.

The user of the user terminal 100 is identified to the catalogue server 102 by user identification data. The user identification data may comprise a separately assigned user identifier, for example an email address associated with the user, a Mobile Subscriber Integrated Services Digital Network Number (MSISDN) associated with the user, or other identification data which is unique to an individual user. The user identification data can also, or alternatively, comprise a user identifier in the form of, for example, a unique code assigned by the catalogue server 102 itself.

Catalogue server 102 may be a single computing device or a cluster of devices, at a single network node or distributed in different network locations, and may be embodied in a single device, or over a number of distributed devices. Catalogue data store 104 includes a database which contains database entries for a number of different downloadable and installable software applications. The database may also store metadata associated with each application, such as a title, and short/long description of the intended function of the application. Catalogue data store 104 may be co-located with catalogue server 102, or alternatively may comprise a separate physical device in a same or different computer network.

The catalogue server 102, when configured according to the embodiments of the invention, provides an application distribution system suitable for use by enterprise networks in particular. The catalogue server 102 maintains installation control settings corresponding to users and applications that are made available for possible download to enterprise user terminals 100. These installation control settings are for use in determining installation control data for such applications, as explained at a high level with reference to FIG. 2, which illustrates two exemplary database entries held in catalogue data store 104. As can be seen, application identifier (AppID) 200 identifies the application to which the database entry relates, while the user identifier (UserID) 202 identifies the user to which the database entry relates. The Installation Control Setting 204 defines the intended relationship between the corresponding application identified by AppID 200, and corresponding user identified by UserID 202.

Figure 3:
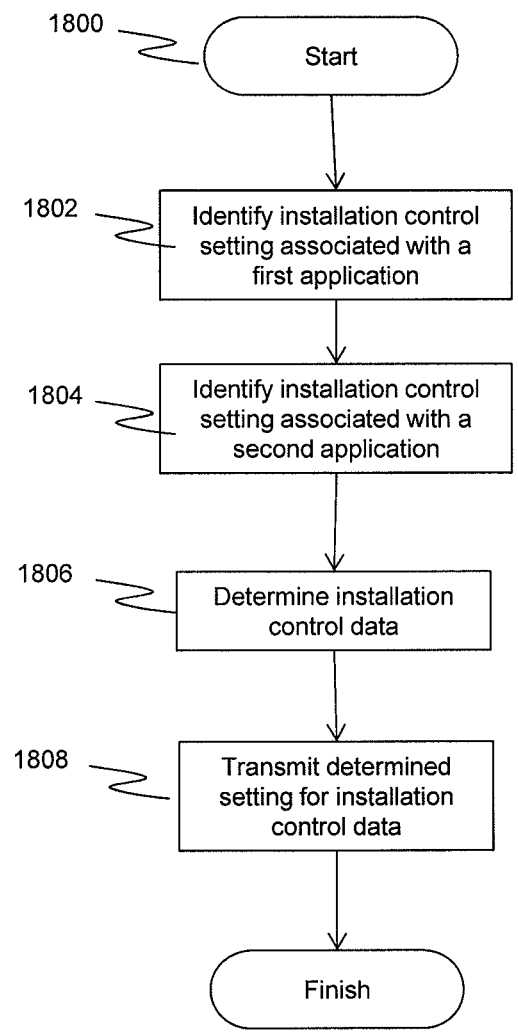
FIG. 3 illustrates a flow chart of the operation of a control setting determination method according to some embodiments.

FIG. 3 illustrates a flow chart of the operation of a control setting determination method according to some embodiments. When determining installation of applications for a given user, the catalogue server 102 retrieves, from the data store 104 a first installation control setting associated with a first application 206 associated with the user and a second installation control setting associated a second application 208 associated with the user, using user identification data such as e.g. a MSISDN at steps 1802 and 1804 respectively.

At step 1806, the catalogue server 102 determines installation control data for one or both of the first and second applications 206, 208 on the basis of at least the retrieved first and second installation control settings. At step 1808, the catalogue server 102 transmits an installation control message comprising the determined installation control data to a user terminal to control installation of at least one of the first and second applications 206, 208 thereon.

In the example shown in FIG. 2, the installation control settings are "allow" and "deny" for the first and second applications 206, 208 respectively. The catalogue server 102 thus determines that the first application 206 can be installed, while the second application 208 cannot, and creates installation control data accordingly. This enables installation control data to be determined in view of previously specified permissions data and provides a mechanism for collectively controlling installation and/or persistence of two or more individual applications. As will be appreciated, collective installation control may be beneficial in preventing installation of incompatible applications.

Any given application may have more than one installation control setting, each having been configured by a different entity. For example, for any given application, there may be one installation control setting for users that are members of an enterprise network, another installation control setting specifically configured for a given user, and/or other installation control settings configured by different entities, such as enterprise network, an application developer and an application provider.

Each installation control setting may be accessible, and configurable, by an entity having an administrative control role with respect to a given application. Each entity having an administrative control role may be given access to the catalogue server 102 via a control interface provided on the catalogue server 102, for example in the form of a web interface or an application programming interface (API) which allows an administrator access to the settings stored in the catalogue data store from a remote terminal connected to the catalogue server 102 via a data communications network. An administrative control role provides a level of administrative control over the entitlement of users to install and run applications that is extended to particular individuals or entities associated with the administrative control role.

Figure 4:
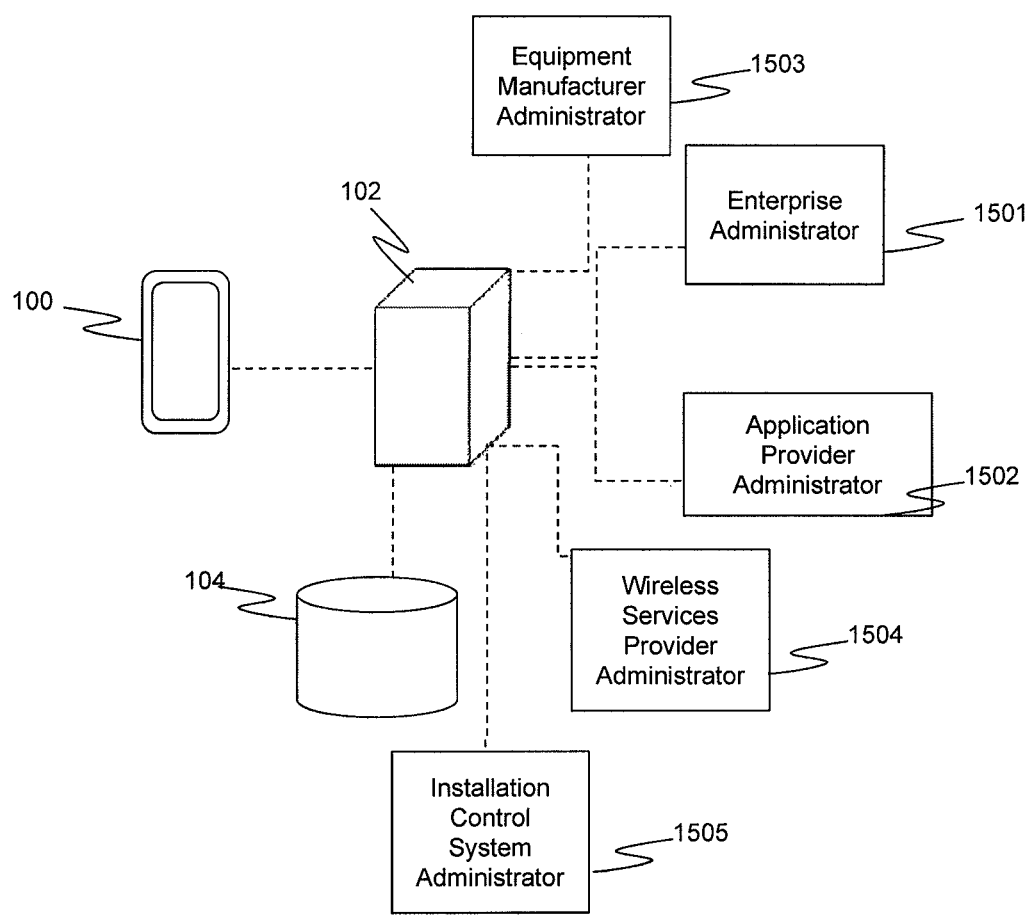
FIG. 4 shows an exemplary architecture for an application installation control system, and various entities that can provide input thereto.

The entities corresponding to the administrative control roles may be of different types, some of which are illustrated in FIG. 4. For example an enterprise administrator 1501 may have an administrative control role, of an enterprise administrator type, which controls which applications may be installed and run on devices associated with its users. A network operator (or carrier) administrator 1504 may have an administrative control role, of a network operator administrator type, which controls which applications may be installed and run on devices to which it provides communication services. A software developer administrator may have an administrative control role, of a software developer administrator type, which controls which users may install and run the applications which it develops. An independent software vendor (ISV) administrator 1502 may have an administrative control role, of an ISV administrator type, which controls which users may install and run the applications which it sells. Further, the entity 1505 which maintains the installation control system itself may have an administrative control role, of an installation control system administrator type, which controls which applications may be installed and run all devices across the whole, or parts of the, installation control system. In addition, an equipment manufacturer administrator 1503 may have an administrative control role, of an equipment manufacturer administrator type, which controls which users may install and run the applications on devices manufactured thereby. It will be appreciated that there may be other types of administrative control roles.

The administrative control entities, via terminals 1501, 1502, 1503, 1504 or 1505, may configure installation control settings by communicating directly with the catalogue server 102. These administrative control terminals may communicate with the catalogue server 102 via the internet once they have provided suitable credentials such as a username and password in order to verify their identity to the catalogue server 102, and thereafter create and/or modify their set of installation control settings.

Returning to FIG. 2, in this example it is assumed that database entry 206 results from configuration by a particular administrative control entity 1501, 1502, 1503, 1504 or 1505 to indicate that a user terminal associated with User A should be allowed access to a given application (Application A). Database entry 208 results from configuration by another administrative control entity 1501, 1502, 1503, 1504 or 1505 to indicate that a user terminal associated with the same user, User A, should be denied access to a different application (Application B).

Several installation control settings may be used with the installation control system. A DENY setting indicates that installation of an application should not be allowed for the corresponding user, and if the application is already installed, the application should be deleted. A SUSPEND setting indicates that installation of an application should not be allowed for the corresponding user, and if the application is already installed, the application should be suspended, but not deleted. A CONTINUE setting indicates that installation of an application should not be allowed for the corresponding user, but if the application is already installed, continuing use of the installed application should be allowed. A FORCE setting indicates that installation of an application should be mandatory for the corresponding user. An ALLOW setting indicates installation of an application be allowed for the corresponding user, but should occur at the initiation of the user. A DEFAULT setting represents an initially undefined setting, which is present before an administrative control role has set the installation control setting to a different setting. It should be noted that these settings are exemplary options for installation control settings, and that any two or more of these different settings, or indeed other settings, may be used to implement an installation control system.

As described previously, there may be more than one administrative control role capable of influencing the relationship between a given application and a given user. In order to reflect this, each administrative control role may configure their own set of installation control settings.

FIG. 5 shows an illustrative example of two different sets of installation control settings according to some embodiments of the installation control system, each associated with a different administrative control role. Table 300 shows the set of installation control settings associated with Administrative Control Role A. Administrative Control Role A configures Installation Control Settings A 306, which indicate the desired installation control settings for a number of applications 302 and a number of users 304 associated with that administrative control role. Similarly, Table 320 shows the set of installation control settings associated with Administrative Control Role B. Administrative Control Role B configures Installation Control Settings B 326, which indicate the desired installation control settings for a number of applications 322 and a number of users 324 associated with that administrative control role.

Under these circumstances, two or more administrative control roles may configure different installation control settings for the same user and application. To resolve such discrepancies, some embodiments include an installation control system conflict resolution algorithm to determine how the relationship between a given user and a given application should be resolved. In alternative embodiments, the settings are initially controlled such that no conflict is possible, and rather than using a conflict resolution algorithm, a multiple setting resolution algorithm is used—e.g. one administrative role is given precedence. The result of the resolution algorithm is installation control data, which defines the resulting installation configuration for a given user in relation to one or more given applications. The installation control data may be stored in the catalogue data store 104 for later reference, or generated as required, transmitted, and then discarded.

A conflict resolution algorithm used in some embodiments identifies a more restrictive installation control setting among those configured by the relevant administrative control roles to determine the corresponding installation control data. In order to utilize this arrangement, the various options for installation control settings may be ordered, for example in terms of their restrictiveness, which is then stored as a predetermined ordering rule used in the algorithm. To use the example installation control settings given above, the order of increasing restrictiveness may be DEFAULT, ALLOW, FORCE, CONTINUE, SUSPEND, DENY.

The catalogue data store database entries shown in FIG. 5 for Application A will now be used as examples of the operation of this conflict resolution algorithm. With regard to User A, both administrative control roles have configured installation control settings (a first set of installation control settings, Installation Control Settings A; a second set of installation control settings, Installation Control Settings B) to indicate that User A should be allowed to install Application A, and hence there is no conflict and the resulting installation control data indicates that User A should be allowed to install Application A.

For User B, one administrative control role has configured their installation control setting to indicate that User B should be allowed to install Application A, and the other administrative control role has configured their installation control setting to indicate that User B should be forced to install Application A. Under this conflict, the FORCE setting is more restrictive than the ALLOW setting, and hence the resulting installation control data indicates that User B should be forced to install Application A.

For User C, one administrative control role has configured their installation control setting to indicate that User C should be allowed to continue to use Application A, but only if already installed, and the other administrative control role has configured their installation control setting to indicate that User C should have access to Application A suspended if already installed. Under this conflict, the SUSPEND setting is more restrictive than the CONTINUE setting, and hence the resulting installation control data indicates that access to Application A should be suspended for User C.

For User D, one administrative control role has configured their installation control setting to indicate that User D should be forced to install Application A, and the other administrative control role has configured their installation control setting to indicate that User C should be denied access to Application A. Under this conflict, the DENY setting is more restrictive than the FORCE setting, and hence the resulting installation control data indicates that User D should be denied access to Application A.

For User E, one administrative control role has configured their installation control setting to indicate that User E should be allowed to install Application A, and the other administrative control role has configured their installation control setting to indicate no preference in the relationship between User E and Application A. Under this conflict, the ALLOW setting is more restrictive than the DEFAULT setting, and hence the resulting installation control data indicates that User D should be allowed access to Application A.

With respect to Application B, FIG. 5 shows a case where both administrative control roles have not yet configured installation control settings for the user in relation to the application. Under these circumstances, the conflict resolution algorithm may yield installation control data which does not correspond to one of the individual installation control settings, but rather may be treated as an exception. The resulting installation control data in this special case may indicate that access to Application B should be denied, as no level of access has been explicitly indicated by either administrative control role.

Figure 6:
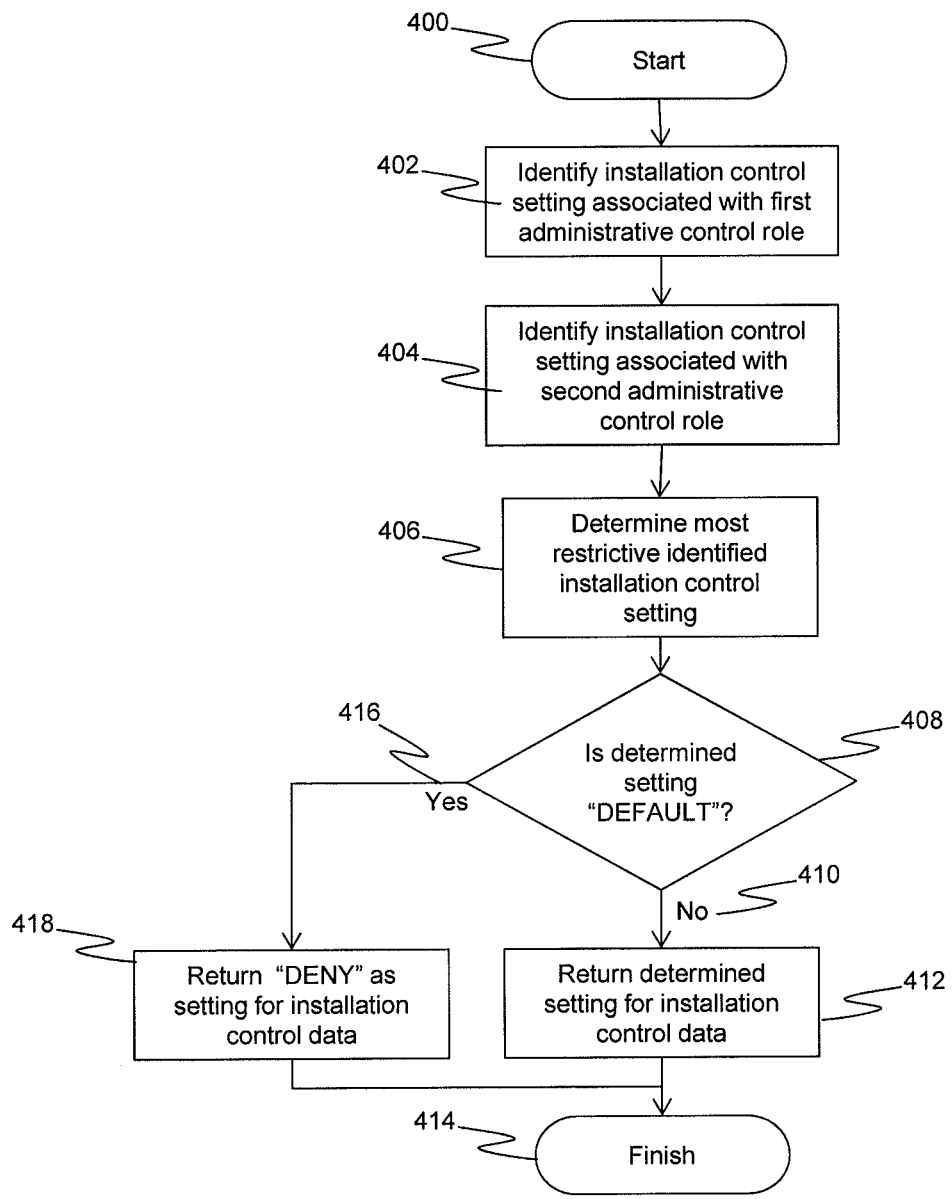
FIG. 6 illustrates a flow chart of the operation of a suitable conflict resolution algorithm according to some embodiments.

FIG. 6 illustrates a flow chart of the operation of a control setting conflict resolution algorithm according to some embodiments. The conflict resolution algorithm described in FIG. 6 is used to generate installation control data for a given application and a given user, based on installation control settings configured by two administrative control roles, which installation control settings may potentially conflict.

The process is started at step 400 by passing the relevant UserID and AppID parameters. The algorithm continues by identifying the relevant installation control settings associated with the first and second administrative control roles at steps 402 and 404 respectively. The installation control settings are identified from the sets of installation control settings associated with each administrative control role (e.g. as shown in FIG. 4) on the basis of the UserID and AppID parameters.

At step 406, the algorithm identifies a most restrictive installation control setting amongst the settings for a user. This could be determined by accessing each of the applicable installation control settings as described previously, and selecting the most restrictive. At step 408 a check is carried out to establish whether the most restrictive installation control setting determined at step 406 is a default setting. If the check is negative (410), the determined most restrictive installation control setting is used to generate the installation control data at step 412, and the algorithm completes at step 414. However, if the check performed at step 408 is positive (416), the algorithm uses DENY as the setting to generate the installation control data at step 418 instead of the setting determined at step 406, and the algorithm completes at step 414.

In order to determine the appropriate installation control settings to reference for the given user and application, the conflict resolution algorithm may search the catalogue data store 104 for database entries that correspond to that user and application. According to alternative embodiments, the algorithm may reference further data stored in the catalogue data store 104 to determine which administrative control roles are associated with a given user (for example, by virtue of being that user's service provider or associated enterprise), and identify appropriate installation control settings by referencing database entries associated with the listed administrative control roles.

Figure 7:
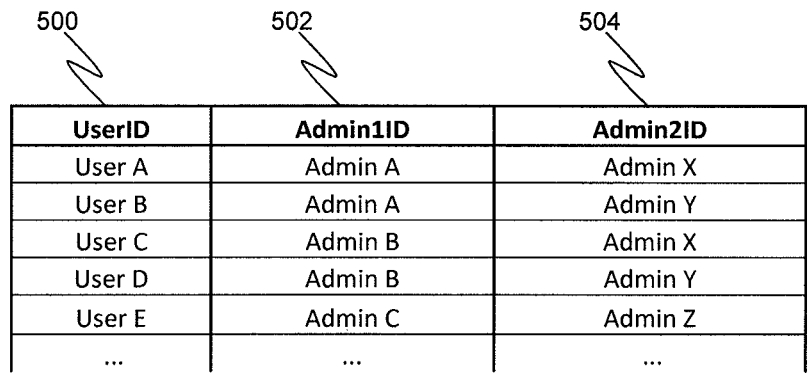
FIG. 7 illustrates exemplary catalogue data store database entries according to some embodiments.

FIG. 7 illustrates exemplary entries from the catalogue data store which may be used to identify the administrative control roles associated with a given UserID 500. The table in FIG. 7 identifies two administrator identifiers (AdminIDs) corresponding to two different types of administrative control role, Admin1ID 502 and Admin2ID 504. The first administrative control role type may, for example, allow an authorized administrator, on the presentation of a first set of credentials, to represent the enterprise the given user belongs to, and the second administrative control role type may, for example, allow a suitably authorized administrator, on presentation of a different, second, set of credentials, to represent the network operator which provides service to that user etc.

The conflict resolution algorithm described in FIG. 6 can be expanded to include installation control settings set by more than two administrative control roles by including additional identifying steps similar to step 404 for third, fourth or fifth, etc. administrative control roles.

As well as configuring installation control settings individually for a user, an administrative control role may also define a user as being part of a group of users, to which installation control settings can be configured as a whole. The groups may be defined on the basis of a common grouping characteristic. For example, an enterprise may wish to configure installation control settings based on each user's role within the enterprise (e.g. every employee in the sales team, or everyone employed in the accounts department).

An administrative control role may also wish to configure an installation control setting that corresponds to all users associated with that administrative control role. For example, an enterprise may wish to configure an installation control setting for a given application that applies to all of its employees, or a network operator may wish to configure an installation control setting for a given application that applies to all of its subscribers. In this way is possible to define a base installation control setting that applies to all users.

Under these circumstances, an administrative control role may configure several different installation control settings which all influence the installation controls for a given user in relation to a given application. For example a user may have an individual entry, a relevant group entry and an "all users" entry set by a single administrative control role, and all relating to the same application. Hence, a decision must be made as to which installation control setting to use for determining the installation control data. In embodiments of the installation control system, the conflict resolution algorithm is expanded to select among a plurality of installation control settings configured by an administrative control role when those settings relate to the same user and the same application. An exemplary method for doing so involves selecting an installation control setting on the basis of a precedence order. For example, an entry for an individual may take precedence over the relevant group entry, which in turn may take precedence over the "all users" entry set. Alternatively or additionally, a most restrictive installation control setting from the several different installation control settings may be selected.

Figure 8:
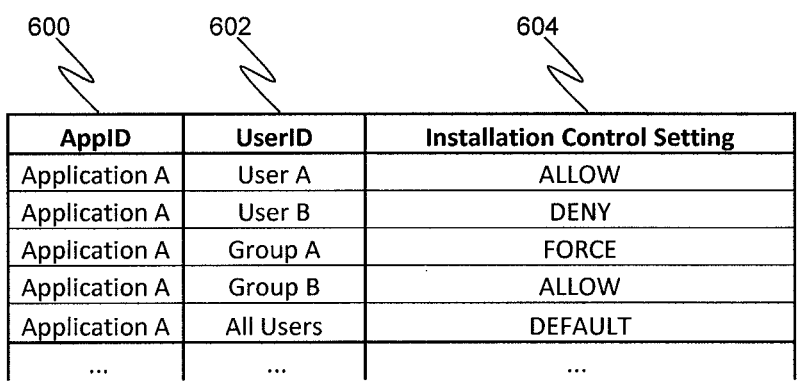
FIG. 8 illustrates exemplary catalogue data store database entries according to some embodiments.

FIG. 8 illustrates exemplary catalogue data store entries configured by a particular administrative control role which has configured installation control settings 604 that indicate a relationship between a given application 600, and a given UserID 602, wherein the UserIDs 602 represent either individual users, groups of users, and all users associated with that administrative control role. In this example, User A is part of Group A, User B is part of Group B, and both User A and User B are associated with the All Users group.

With regard to User A, the administrative control role has defined an individual installation control setting to indicate that User A should be allowed to install Application A, but has also configured an installation control setting to indicate that users in Group A should be forced to install Application A. Under this conflict, the FORCE setting is more restrictive than the ALLOW setting and the DEFAULT setting, and hence the relevant installation control setting from this administrative control role to be used when determining the installation control data is FORCE.

With regard to User B, the administrative control role has defined an individual installation control setting to indicate that User B should be denied access to Application A, but has also configured an installation control setting to indicate that users in Group B should be allowed to install Application A. Under this conflict, the DENY setting is more restrictive than the ALLOW setting and the DEFAULT setting, and hence the relevant administrative control setting from this administrative control role to be used when determining the installation control data is DENY.

Figure 9:
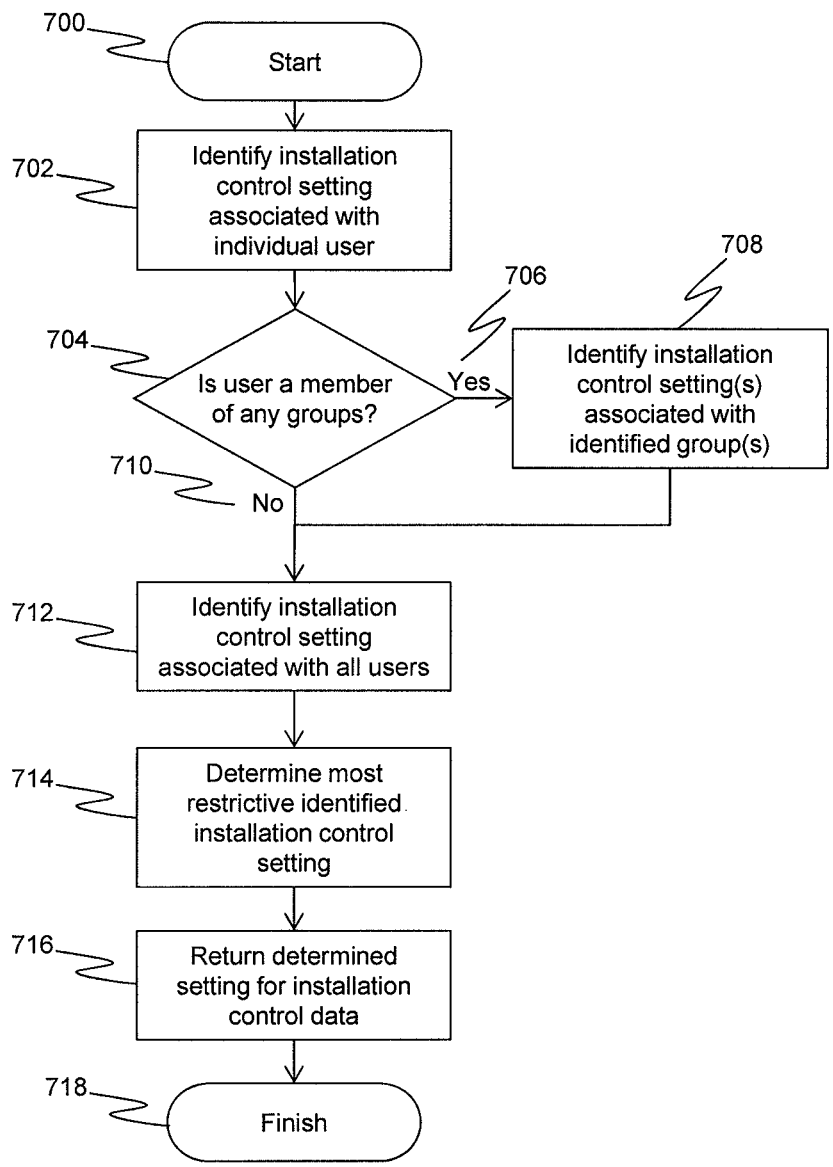
FIG. 9 illustrates a flow chart of exemplary extended functionality of an installation control setting conflict resolution algorithm according to some embodiments.

FIG. 9 illustrates a flow chart of the additional functionality of a conflict resolution algorithm over that of the algorithm depicted in FIG. 6. The functionality described in FIG. 9 is used to determine the appropriate installation control setting to be considered for a particular administrative control role when determining the installation control data for a given application and user.

The process is started at step 700 by passing the relevant UserID, AppID and AdminID parameters. The process continues by identifying among the entries in the catalogue data store 104 associated with the relevant administrative control role, an installation control setting associated with the given application and the individual user at step 702. At step 704, the process determines whether the user is a member of any groups associated with the given administrative control role. If one or more groups are identified for which the user is a member (706), the process goes on to identify any installation control setting associated with the given application and those groups at step 708. If no groups are detected for which the user is a member 710, the process continues at step 712, by identifying any installation control setting configured by the administrative control role that applies to all users associated with that administrative control role.

Once all relevant installation control settings have been identified, the selection of the appropriate setting to use occurs at step 714, by determining the most restrictive amongst the identified installation control settings. The determined setting is then returned in step 716, and the process terminates at step 718.

According to some embodiments, a fallback installation control setting may be configured by an administrative control role for all, or a set of users, to be used if a more specific installation control setting has not been configured (e.g. those for the individual user or a group of which they are a member). In these embodiments, the fallback installation control setting may be used only if all other installation control settings relating to the given user and application are in the default setting.

Figure 10:
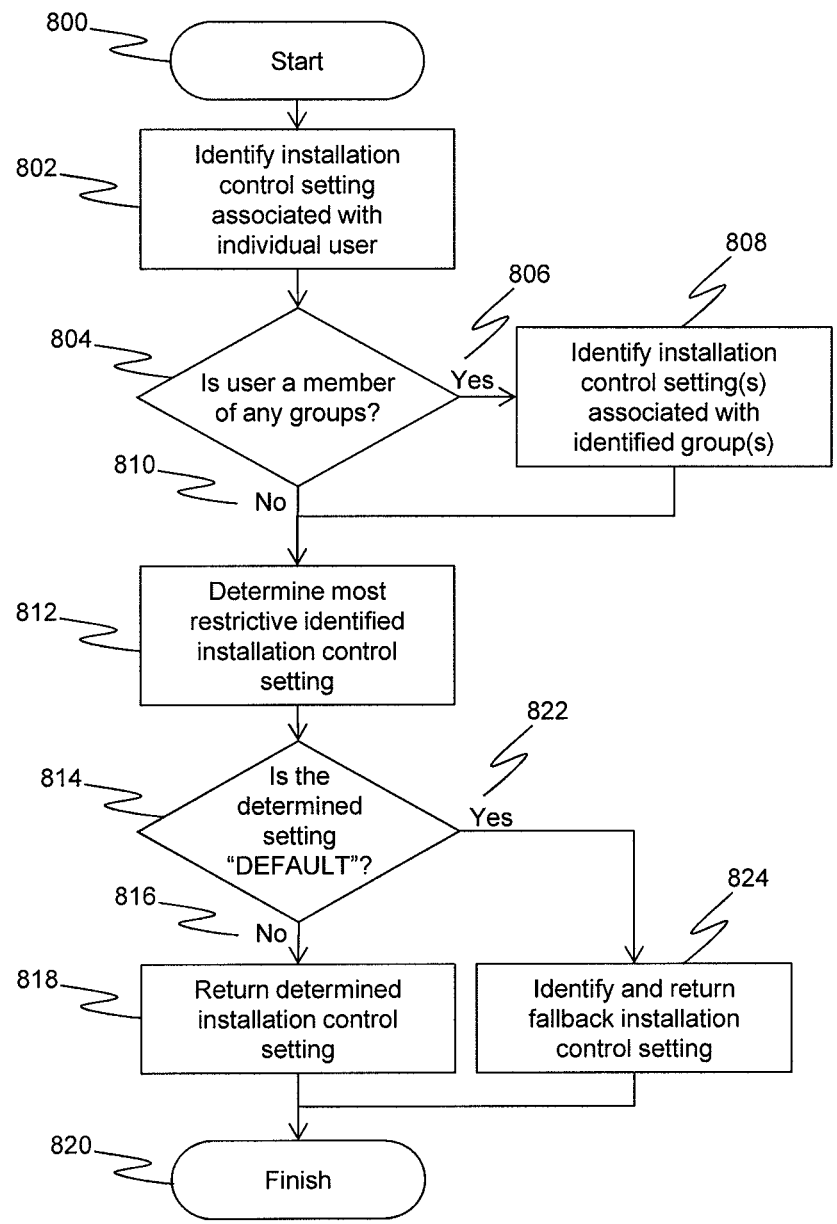
FIG. 10 illustrates a flow chart of exemplary extended functionality of an installation control setting conflict resolution algorithm according to some embodiments.

FIG. 10 shows a modification to the process of FIG. 9, according to a further embodiment. The process is started at step 800 by passing the relevant UserID, AppID and AdminID parameters. The process continues by identifying among the entries in the catalogue data store associated with the relevant administrative control role, the installation control setting associated with the given application and the individual user at step 802. At step 804, the process determines whether the user is a member of any groups associated with the given administrative control role. If one or more groups are identified for which the user is a member (806), the process goes on to identify any installation control setting associated with the given application and those groups at step 808, otherwise (810) the process continues directly to step 812.

The process continues at step 812, by determining the most restrictive amongst the identified installation control settings. The determined setting is checked at step 814 to identify whether the determined setting is a default setting, and if not (816) the process returns the determined installation control setting at step 818 and the process terminates at step 820. However, if the determined setting is a default setting (822), the process identifies and returns the fallback installation control setting for the user and the given application in step 824, and the process terminates at step 820.

The installation control data may comprise the selected or determined installation control setting(s), in substantially identical form to the settings stored in the catalogue data store 104, and/or may include data derived from the selected or determined setting(s). The installation control data is, in some embodiments, transmitted by the catalogue server 102 during interactions between a user terminal 100 and the catalogue server 102. It may thus be included in an installation control message transmitted to the user terminal 100. Alternatively, or in addition, it may be transmitted by the catalogue server 102 during interactions between an application repository and the catalogue server 102. It may thus be included in an installation control message transmitted to the application repository to enable the application repository to determine a response to a request for an application from a user terminal.

The installation control data may be used in the process of viewing a selection of applications available to download and install on the user terminal, and indeed may be used in the process of downloading applications to install on the user terminal. The installation control data may be used to determine download conditions, for example to prevent download of an application to which a user is not entitled, thus preventing its installation and performing installation control in that manner. Alternatively, or in addition, the installation control data may be used to determine installation conditions, which may be sent in conjunction with a downloaded application. These installation conditions may for example enforce installation control settings on the user terminal, for example a forced upgrade of an installed application. Applications may be installed by downloading and executing application installation files, which are typically stored as packages.

According to some embodiments, the application installation packages are stored in the application repository. The application repository may be comprised within the same physical storage hardware as the catalogue data store, or alternatively it may be held elsewhere. According to some embodiments, application installation packages may be stored on hardware external to the installation control system, for example on an enterprise server, which allows the installation packages to be held under the control of that enterprise, and not under the control of the installation control system operator.

As described in the background section, conventional application distribution systems restrict the browsing of available applications to user terminals. By contrast, the architecture of the catalogue server 102 is arranged in such a way that it provides a channel for exposing applications that been developed by e.g. an independent software vendor, to an administrative control entity 1501 of an enterprise network. As a result, the IT and policy administrators of the enterprise can review these available applications and configure additional (overriding) installation control settings for these available applications and control settings for their own enterprise applications, taking account of these third party applications.

Such third party application providers may indicate which of their applications are suitable for a given enterprise, and application suitability information may be maintained in a table maintained by the data store 104, as illustrated by table 1600 in FIG. 11, where Provider A considers applications A, B and C to be suitable for Enterprise A and applications A, D and E to be suitable for Enterprise B.

Alternatively or additionally, third party application providers may indicate which of their applications are unsuitable for a given enterprise, and thereby control which applications are exposed to which enterprises. For example, per the above example, instead of indicating that Applications A, B and C are suitable for Enterprise A, Provider A could instead indicate that Applications D and E are unsuitable for this enterprise, thereby ensuring that Applications D and E are not exposed to Enterprise A. Application unsuitability information may be maintained in a table maintained by the data store 104.

Notwithstanding the above, third party application providers may alternatively or additionally be restricted as regards which the enterprises to which they are able to expose their applications. This could be enforced via associations between application providers and enterprises. Without limitation, such association could be formed on the basis of a prior transaction, e.g. a third party application provider has previously supplied applications to an enterprise, or it could be formed on the basis of a mutual agreement. Mutual agreements could be established for a predefined period of time, such as a week, or for a predefined number or type of applications, and may need to be re-established upon expiry. Mutual agreements concerning an enterprise may be authorized by its corresponding administrative control function 1501 or they may be authorized by a trusted entity, such as the administrative control function 1505 corresponding to the installation control system, on its behalf. In use, prior to publishing applications from a third party application provider, the installation control system would determine those enterprises with which the application provider has an association and indeed the nature of the association, and consequentially limit publication accordingly. It will be understood that associations between third party application providers and enterprises are likely to change over a period of time; as a consequence the channel for exposing applications to a given enterprise may be updated periodically or prior to every use. Association information may be maintained in a table maintained by the data store 104.

Third party application providers may also identify applications for different uses by users of enterprise networks via settings such as "demo" or "trial". For example, turning to FIG. 12, table 1700 indicates that Application A is available in 'Demo' mode for various groups of users, within different enterprises, and indicates that Application B is "Allowed" for a group of users in a particular enterprise only. Once this information is available from the application provider, the enterprise administrative control entity 1501 is able to configure installation control setting B, with the knowledge of the type of applications. For example, in one arrangement the control setting specified by the enterprise for Application A may restrict deployment a specific and specified group, such as 'trial group', within the enterprise as illustrated in table 1720 of FIG. 12. In arrangements in which the enterprise control settings override those of other entities, this means that Application A will be allowed to be downloaded by only to this trial group within enterprise A, rather than, as is specified by the control setting and user identification information specified by the application developer, everyone in enterprise A.

Thus, the catalogue system 102 additionally enables application providers to efficiently expose their applications to enterprise networks, which can evaluate and take account of the applications and specify appropriate installation control settings to enable e.g. trials of applications within a controlled environment.

Figure 13:
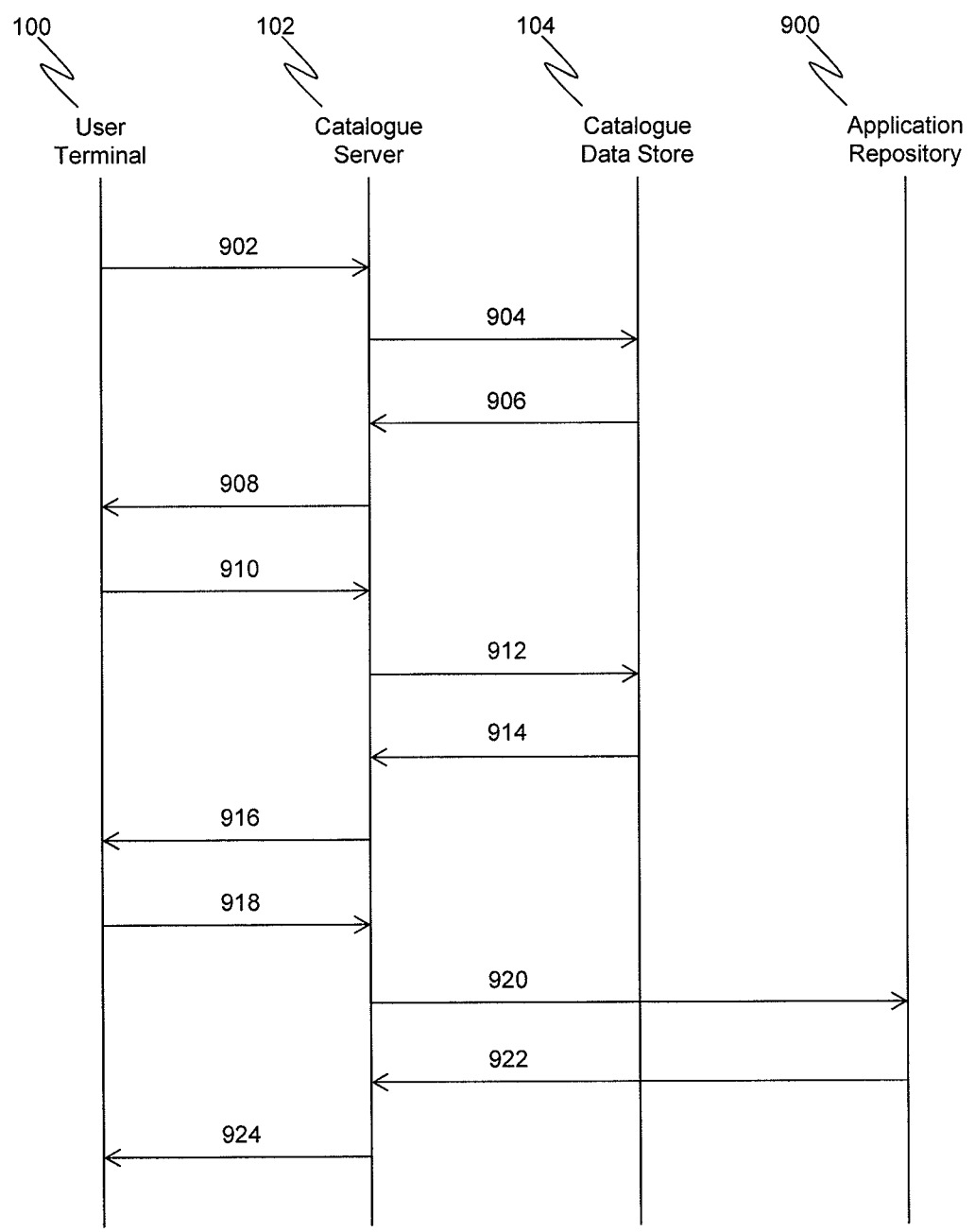
FIG. 13 is a message flow diagram illustrating an exemplary application download process according to some embodiments.

FIG. 13 is a message flow diagram illustrating a process whereby a user may view a selection of available applications, and select and install an application on a user terminal according to some embodiments of the installation control system. The message flow starts with user terminal 100 sending an application list request message 902 to catalogue server 102. Application list request message 902 contains a user identifier by which the catalogue server 102 may identify the user associated with user terminal 100. On the basis of the user identifier obtained from application list request message 902, catalogue server 102 sends a query message 904 to catalogue data store 104 in order to obtain the necessary installation control data associated with the identified user, and the catalogue data store responds with query response message 906.

The installation control data for the identified user may be pre-computed prior to the start of the message flow or it may be computed on demand in response to receiving the application list request message 902; in both of these cases query response message 906 comprises the necessary installation control data. According to alternative embodiments, the installation control data may be computed on the user terminal 100, in which case query response message 906 contains the necessary installation control settings required to compute the installation control data.

On the basis of the installation control data, a list of applications that the user terminal 100 is entitled to download and install may be generated. For example, the application list may contain references to all applications for which the corresponding application control data for the given user is set to ALLOW. According to some embodiments, the application list may also be pre-computed prior to the start of the message flow, and stored in catalogue data store 104, in which case query response message 906 may contain the application list for the identified user terminal as part of the installation control data.

Having obtained the application list, application list message 908 is transmitted to user terminal 100. The application list message 908 may for example include the AppID for each listed application, along with some metadata for each application, such as title and a brief description. In the case that the list contains a large number of applications, application list message 908 may contain information for only a subset of the listed applications, wherein information for further listed applications may be obtained by sending a modified application list request message from user terminal 100.

On the basis of the received application list message 908, user terminal 100 may present a list of the applications to the user, from which the user can browse and select a desired application for which they which to view complete metadata. Selection of a desired application by the user results in a metadata request message 910, containing the AppID of the selected application, being sent to catalogue server 102. In response to receipt of metadata request message 910, the catalogue server 102 sends metadata query 912 comprising the received AppID to catalogue data store 104, which responds with requested metadata 914. Catalogue server 102 sends the requested metadata to user terminal 100 as part of metadata message 916, which user terminal 100 then presents to the user in order to aid the user in deciding whether or not to download and install the application.

If the user indicates that they wish to install the application, for example by pressing a button on user terminal 100, application request message 918 is sent to catalogue server 102. Application request message 918 contains the AppID of the desired application, which catalogue server 102 may optionally use to verify for a second time that the user should be allowed to install the corresponding application, which is done on the basis of the installation control settings for the user in relation to the application as described above. Catalogue server 102 then fetches the application installation package from application repository 900, by sending get application message 920. Application repository 900 responds with the requested application installation package 922, which is passed by catalogue server to user terminal 100 in application message 924. According to alternative embodiments, the application repository may send the application installation package directly to user terminal 100, in order to avoid the application installation package passing through the catalogue server (for reasons described above).

According to some embodiments, selection of an application from the application list may represent an intention to install that application, in which case the step of requesting complete metadata for an application may be skipped, and messages 910 to 916 are removed from the message flow.

Figure 14:
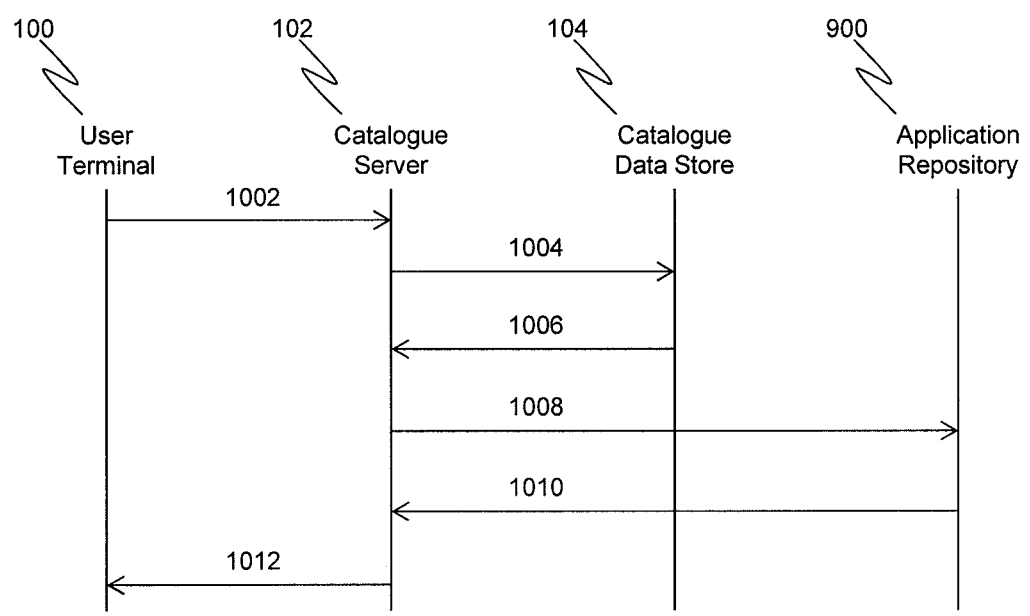
FIG. 14 is a message flow diagram illustrating an exemplary application download process according to some embodiments.

FIG. 14 is a message flow diagram illustrating an alternative method for initiating installation of an application on a user terminal. In FIG. 14, user terminal 100 sends application request message 1002 to catalogue server 102 without first requesting an application list from the terminal 100. Application request message 1002 contains the user identifier parameter associated with the user, and the application identifier for the requested application. Catalogue server 102 then sends query 1004 to catalogue data store 104 to retrieve application data 1006 corresponding to the given application and user identifier parameters. On the basis of the retrieved installation control data, catalogue server 103 may determine whether the user terminal 100 should be allowed access to the requested application. If the retrieved installation control data indicates that user terminal 100 should not be allowed access to the requested application, an access denied message (not shown) may be sent to user terminal 100 and the message flow is terminated. However, if the retrieved installation control data indicates that user terminal 100 should be allowed access to the requested application, catalogue server 102 fetches the application installation package from application repository 900, by sending get application message 1008. Application repository 900 responds with the requested application installation package 1010, which is passed by catalogue server to user terminal 100 in application message 1012.

In order to facilitate the installation of those applications to which the installation control data indicates that the user should be forced to install the application, the catalogue server may also transmit a list of mandatory applications. The user terminal may then notify the user of the mandatory applications which should be installed, and the user may initiate the installation of the mandatory applications according to the message flows described above. However in order to ensure the installation of the mandatory applications it may be necessary to also install client side software on the user terminal 100. When the user terminal connects to the catalogue server 102, for example when downloading and viewing the application list, the mandatory application list may be downloaded at the same time and reviewed by the client side software. If the client side software identifies any uninstalled mandatory applications, the client side software may handle the download and installation of those applications according to the message flows described above autonomously, perhaps without requiring or allowing interaction with the user.

Over time, the administrators representing different administrative control roles may update some of their set of installation control settings stored in the catalogue data store 104, for example to reflect newly released applications or new policies regarding which applications should be installed on user devices.

An administrator 1501, 1502, 1503, 1504 or 1505 may modify one of their set of installation control settings by sending an installation control modification message from their administrator terminal to the catalogue server 102 containing the AppID, UserID and updated installation control setting. Having verified the identity of the administrator 1501, 1502, 1503, 1504 or 1505, the catalogue server 102 may implement the update by modifying the corresponding entry in the catalogue data store, or adding a new entry as appropriate. The updating of an installation control setting by an administrator 1501, 1502, 1503, 1504 or 1505 of a particular administrative control role may also cause the catalogue server 102 to recalculate the associated installation control data, in response to the update.

According to alternative embodiments, an administrator 1501, 1502, 1503, 1504 or 1505 may be able to modify the catalogue data store 104 directly, in which case the catalogue server 102 may monitor the catalogue data store 104 for updates in order to detect when installation control data should be recalculated.

Having recalculated installation control data on the basis of the updated installation control setting, the catalogue server 102 may notify any users corresponding to the new installation control data of the change to the installation control data by sending an installation control update message or the user terminal. This message could be sent according to the methods discussed previously, or alternatively may utilize a push notification channel. A push notification channel is an alternative communication channel which is kept open between a server and a client, which the server may use to inform the client that new data is ready to be downloaded via the main communication channel. The catalogue server may send push notifications directly to the user terminal, or may use a push proxy server to maintain the open push notification channel with the user terminal 100, and transmit push notification messages via the push proxy server. In this case, a push notification message may prompt the user terminal 100 to fetch the installation control update message via the standard communication channel.

The installation control update message may be received an interpreted by the client side software installed on the user terminal 100, which can carry out the necessary actions in order to enforce the new installation control data. For example, if the installation control update message includes installation control data relating to an installed application, and the installation control data indicates that access to the installed application should be suspended or denied for that user, then the client side software may initiate the suspension or uninstall that application. Further, if the installation control update message includes installation control data for an application that is not installed, and the installation control data indicates that application should be force installed on that user terminal, then the client side software may initiate the installation of that application according to the methods described above.

Figure 15:
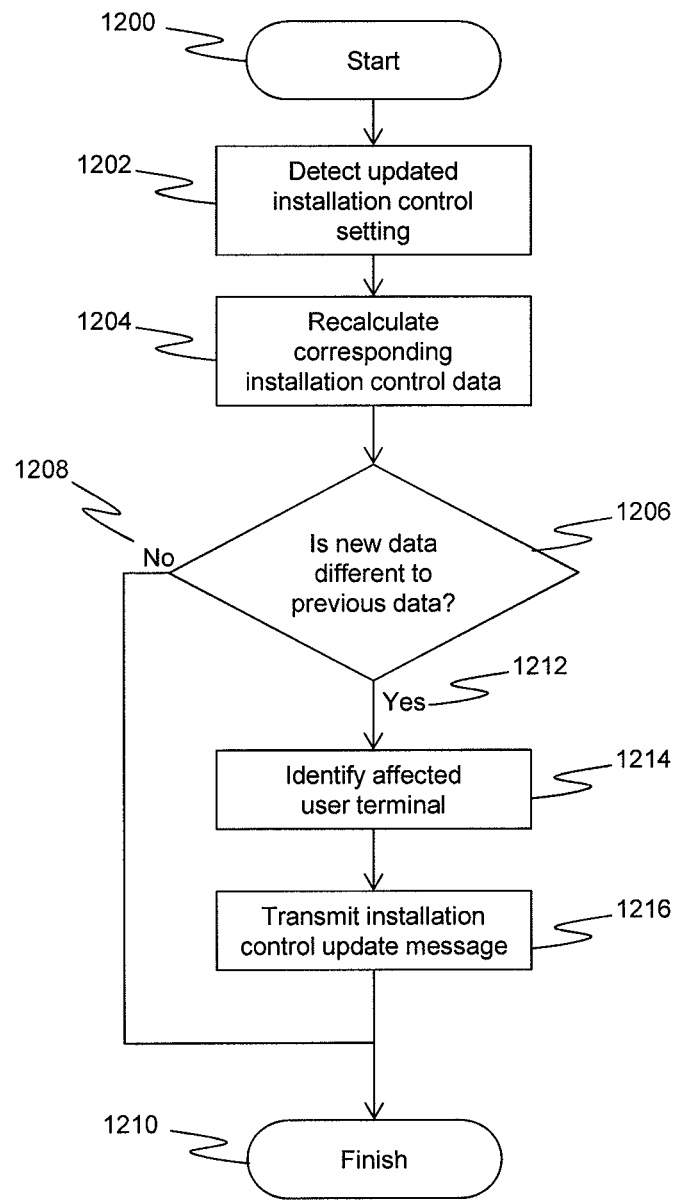
FIG. 15 is an exemplary flow chart illustrating the process of handling an updated installation control setting according to some embodiments.

FIG. 15 is an exemplary flow diagram illustrating the process of handling an updated installation control setting according to embodiments of the installation control system. The process starts at step 1200, for example in response to receiving an installation control update message from an administrative control role. An updated installation control setting is detected at step 1202, and the corresponding entry in the catalogue data store 104 is updated (or created if no entry already exists). At step 1204, the updated installation control setting is used to recalculate the corresponding installation control data. At step 1206, the recalculated installation control data is compared to the previous installation control data to determine whether the updated installation control setting has had an effect on the resulting installation control data. If the new installation control data is the same as the previous installation control data 1208, the process terminates at step 1210. However, if the new installation control data is different from the previous installation control data 1212, the process goes on to identify all user terminals 100 corresponding to the new installation control data at step 1214. At step 1216, the catalogue server sends an installation control update message to the affected user terminals 100 in order to inform them of the change in installation control data.

In order to prevent the transmission of unnecessary installation control update messages to a user terminal 100, the installation control system may maintain lists of installed applications for each user terminal 100, which may also be stored in the catalogue data store 104. By referencing such a list of installed applications, the catalogue server 102 may filter the installation control update messages sent to each user terminal on the basis of which applications are known to be installed on that user terminal 100. For example, if the installation control data for a given user and application is updated to indicate that access to the application should now be suspended or denied for that user, then an installation control update message only need be sent to the user if that application is known to be installed on a corresponding user terminal. Further if the installation control data for a given user and application is updated to indicate that installation of the application should now be forced for that user, then an installation control update message only need be sent to the user if that application is known to not be installed on a corresponding user terminal.

According to some embodiments, in order to ensure that each list of installed applications properly reflects the applications installed on a given user terminal 100, the client side software installed on the user terminal 100 may be configured to send an application installed message containing the relevant AppID parameter to the catalogue server each time a new application is installed on the user terminal 100, and an application uninstalled message containing the relevant AppID parameter to the catalogue server each time an application is uninstalled. The catalogue server 102 may then respond to the receipt of these messages by editing the list of installed applications corresponding to that user terminal in the catalogue data store 104.

It is possible that an administrative control role may update an installation control setting while the user device 100 associated with the corresponding user is unavailable. Under these circumstances, some embodiments of the installation control system provide a registration process, by which a user terminal 100 may be informed of any updates to relevant installation control data that occurred while the device was unavailable. Such a registration process may simultaneously register the user terminal to receive subsequent installation control update messages, since the catalogue server 102 has been informed that the user terminal is once again available. The registering of the user terminal to receive subsequent installation control update messages may include the establishment of the push notification channel (if used).

Figure 16:
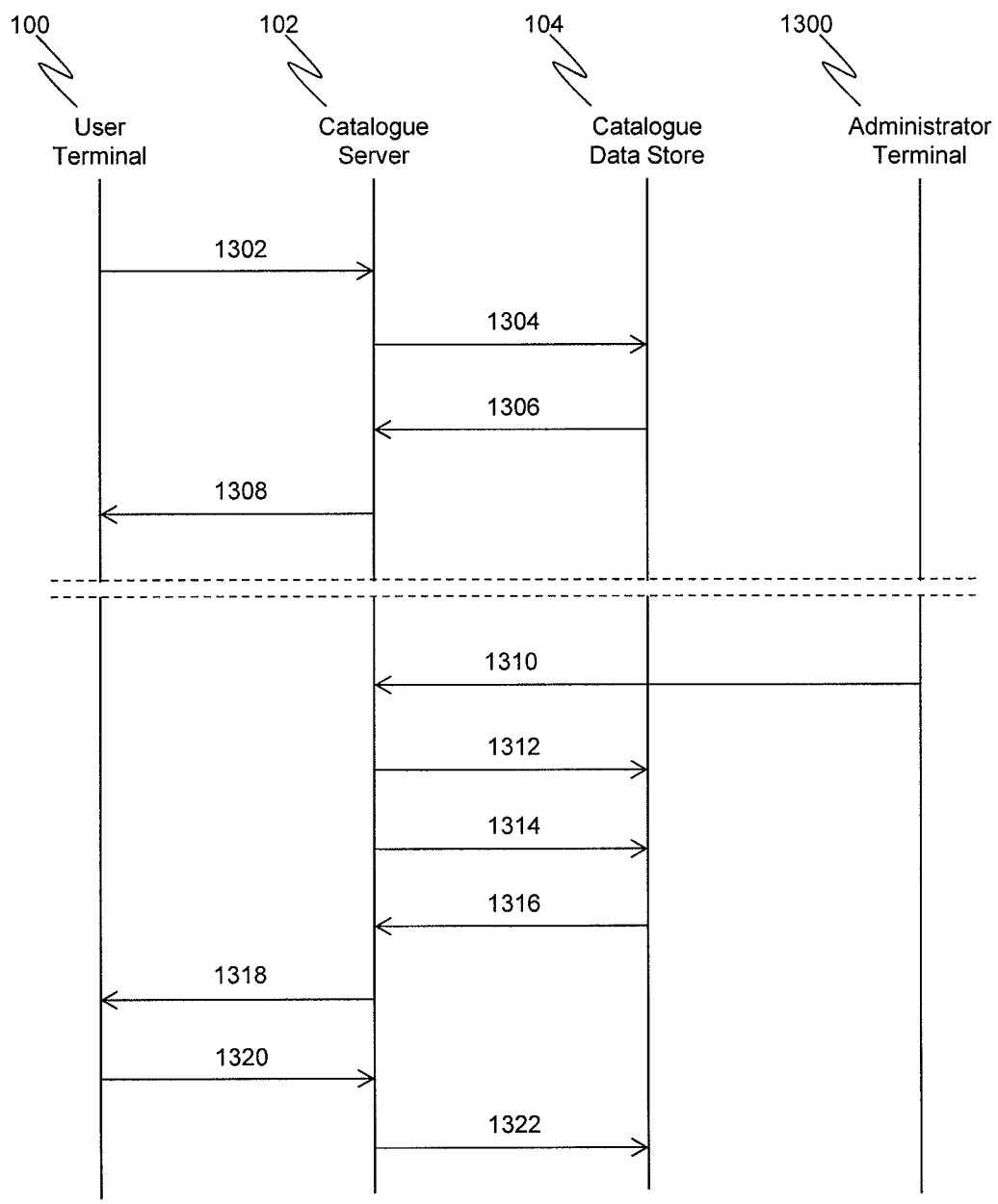
FIG. 16 illustrates an exemplary message flow diagram for handling an updated installation control setting according to some embodiments.

FIG. 16 illustrates an exemplary message flow diagram for a registration process and handling of an updated installation control setting according to some embodiments of the installation control system. At the start of the message flow, user terminal 100 has just come online after a temporary period of unavailability, and sends update subscription message 1302 to catalogue server 102, which contains the user identifier parameter associated with user terminal 100. In response to receiving update subscription message 1302, catalogue server 102 sends a query 1304 to catalogue data store 104 to obtain a list of applications known to be installed on user terminal 100 and corresponding installation control data for those applications, as well as any applications for which the installation control data indicates that installation should be forced on user terminal 100. The requested data 1306 is returned from the catalogue data store, and used to form installation control registration message 1308, which informs user terminal 100 of any changes to relevant installation control data that may have occurred while the terminal was unavailable. According to this message flow, it is assumed that no changes have been made.

Sometime later, catalogue server 102 receives an installation control modification message 1310 from administrator terminal 1300, which contains the relevant AppID, UserID and installation control setting parameters for the updated installation control setting. Administrator terminal 1300 may first be required to complete an authentication procedure (not shown) such as providing a valid username and password combination, before installation control modification message 1310 is accepted. On the basis of the received installation control modification message 1310, catalogue server 102 updates the relevant entry in catalogue data store 104 via database update message 1312, and also recalculates any relevant installation control data on the basis of the updated installation control setting. On the basis of the recalculated installation control data, catalogue server sends query message 1314 to catalogue data store 104 in order to identify those users affected by the recalculated installation control data, and a list of installed applications for each identified user. The requested data 1316 is returned from the catalogue data store, and used by catalogue server 102 to generate installation control update message 1318. Installation control update message 1318 contains the recalculated installation control data for the relevant application, and may be sent to a number of user terminals affected by the recalculated installation control data on the basis of whether the given application is installed on each of those user terminals. Installation control update message 1318 is sent to user terminal 100 as a result of that analysis.

In response to receiving the installation control update message, the client side software installed on user terminal 100 executes the necessary actions in order to enforce the new installation control data, by installing, suspending or uninstalling the relevant application as necessary (according to the methods described previously). Once the necessary action had been carried out, user terminal 100 informs catalogue server 102 of the installation/uninstallation by sending application installed/uninstalled message 1320 which includes the AppID of the relevant application. In response to receiving message 1320, catalogue server updates the corresponding list of installed applications for user terminal 100 stored in catalogue data store 104 accordingly, by sending database update message 1322.

As well as maintaining installation control settings for each application in the catalogue data store, some embodiments of the installation control system also maintain individual installation control settings for each version of the available applications. This arrangement gives an administrative control role a finer level of granularity when deciding which applications a given user can install and configuring the corresponding installation control settings. According to these some embodiments, installation control data is therefore also calculated on a per version basis.

FIG. 17 illustrates a number of exemplary database entries according to some embodiments of the installation control system. As well as UserID 1404, each AppID 1400 also has a corresponding VersionID which describes which version of the application the given installation control setting 1406 relates to. By configuring different combinations of these version-level installation control settings, some embodiments of the installation control system allow certain special behaviors can be invoked. Here it is assumed that all users have Version 1 of Application A installed on their user terminal. The behaviors invoked by the database entries set out in FIG. 15 are described below. It should be noted that installation control settings only represent the intentions of a single administrative control role, and the intended results will only be put into effect if the same combinations are reflected in the determined installation control data.

The database entries define that User A should be allowed to use the installed Version 1 of Application A, but that User A should be prevented from installing Version 2 of Application A. The result of this is that the installation control settings indicate that User A should be prevented from upgrading to Version 2 of the application. This is particularly useful in an enterprise environment, where the enterprise's administrative control role 1501 may wish to prevent its users from upgrading to a new version of an application while they carry out compatibility or security tests on the new application version. A similar effect can be achieved by configuring Version 1 to the CONTINUE or FORCE settings, and/or Version 2 to the SUSPEND setting.

The database entries define that User B should not be allowed to use the installed Version 1 of Application A, and that User B should be allowed to install Version 2 of Application A. The result of this is that the installation control settings indicate that User B should be forced to upgrade to Version 2 of the application in order to continue using it. This is particularly useful where an error may have been found in Version 1 of the application that has been fixed in Version 2, and the administrative control role wishes to prevent the user from experiencing the error. A similar effect can be achieved by configuring Version 1 to the DENY setting, and/or Version 2 to the CONTINUE or FORCE settings.

The database entries define that User C should be allowed to use the installed Version 1 of Application A, but that User C should be forced to install Version 2 of Application A. The result of this is that the installation control settings indicate that User C should be forced to upgrade to Version 2 of the application, thereby overriding the CONTINUE setting corresponding to version 1. A similar effect is achieved when Version 1 is configured to the CONTINUE setting.

The database entries define that User D should be allowed to continue to use the installed Version 1 of Application A, and that User D should be allowed to install Version 2 of Application A. The result of this is that the installation control settings indicate that User B may continue to use Version 1, but may also upgrade to Version 2 of the application if desired. This is beneficial where an administrative control role wishes to allow only those users who have already installed Version 1 to continue using it, while forcing new users who wish to install the application to download Version 2.

The database entries define that User E should be allowed to use the installed Version 1 of Application A, and that User E should also be allowed to install Version 2 of Application A. The result of this is that the installation control settings indicate that User E should be free to decide whether to continue to use Version 1, or upgrade to Version 2 of the application.

The database entries define that User F should be denied from using the installed Version 1 of Application A, and that User F should also be denied from installing Version 2 of Application A. The result of this is that the installation control settings indicate that User E should be forced to uninstall the application.

Finally, database entries 1430 and 1432 define that User G should be forced to use the installed Version 1 of Application A, and that User G should also be forced to install Version 2 of Application A. This is a special case that appears to show conflicting installation control settings. However, embodiments of the installation control system cater for this situation by forcing the user terminal to install the most recent version of the application. Hence, the result of this combination is that the installation control settings indicate that User G should be forced to upgrade to Version 2 of the application.

According to some embodiments, the catalogue data store may also maintain entries for multiple different installation packages for a given application or version, each suitable for different terminal hardware configurations, or languages etc. Under these embodiments, the installation control system may only offer applications to a user terminal for which an appropriate package exists.

Figure 18:
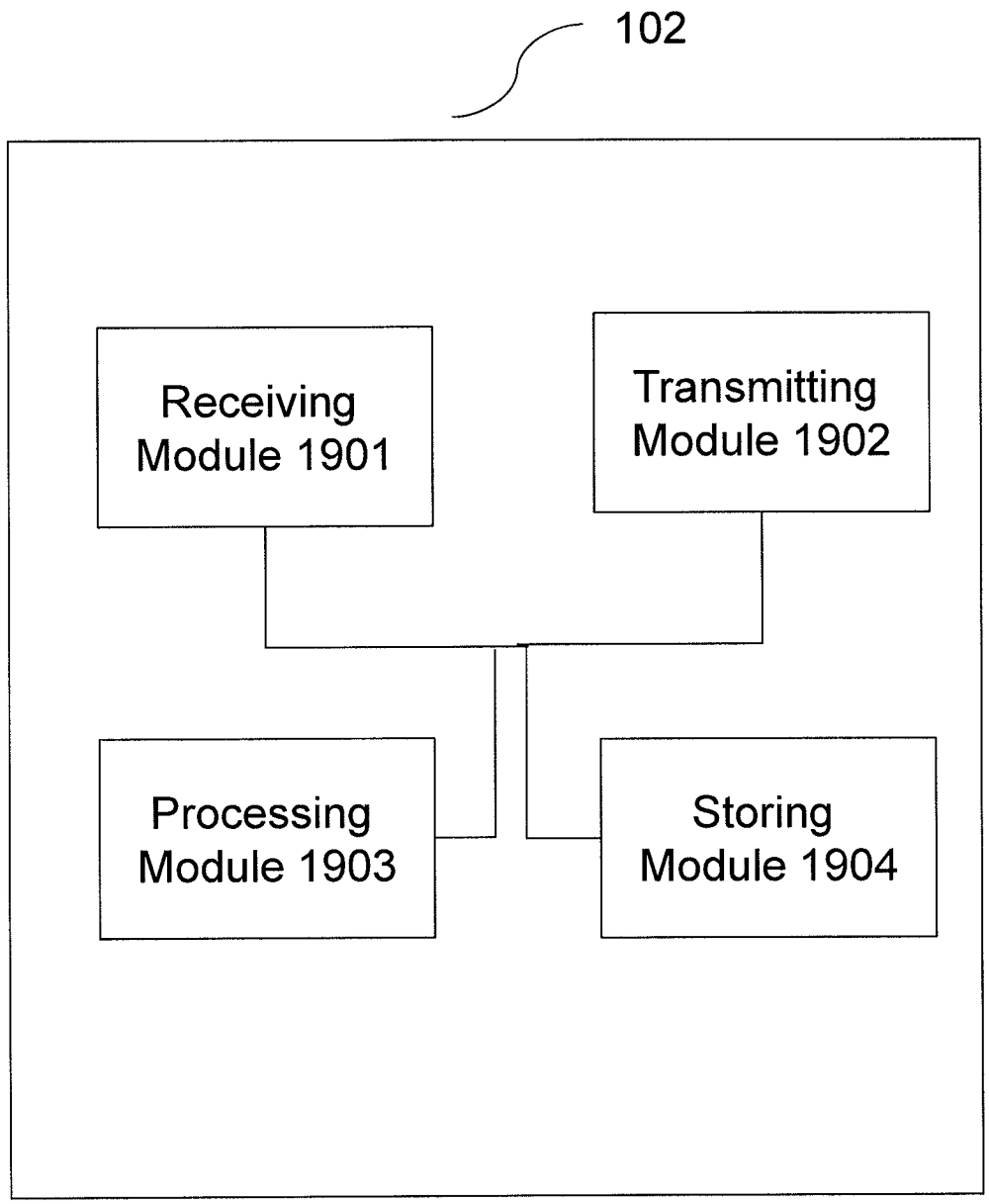
FIG. 18 is a functional block diagram of an exemplary catalogue server.

FIG. 18 is a functional block diagram of an exemplary catalogue server 102. As shown, the catalogue server 102 may comprise a processing module 1903, a storing module 1904, a receiving module 1901 and a transmitting module 1902. The processing module 1903 may correspond at least in some aspects to, for example, a processor as discussed herein. The storing module 1904 may correspond at least in some aspects to, for example, a memory as discussed herein. The receiving module 1901 may correspond at least in some aspects to, for example, a processor, a receiver and/or a transceiver as discussed herein. The transmitting module 1902 may correspond at least in some aspects to, for example, a processor, a transmitter and/or a transceiver as discussed herein.

The functionality of the modules of FIG. 18 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

For example, the modules may be implemented, at least in part, as program instructions for execution by a processor, as logic circuits, as an application specific integrated circuit, as firmware, etc. For example, the embodiments can be implemented as one or more software or firmware applications, computer-implemented methods, program products stored on a computer useable medium, for execution on one or more processors (e.g., CPU, microcontroller) or other computing devices in a wireless station.

More particularly, the catalogue server, catalogue data store and user terminal of the above some embodiments may be configured to operate according to the above some embodiments by executing computer programs held in computer readable media. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray™ disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The above some embodiments are to be understood as illustrative examples of the invention. Further some embodiments of the invention are envisaged. For example, the functions carried out by the catalogue server or the catalogue data store may be equally performed by multiple distributed hardware resources instead of the unitary hardware described above. It is to be understood that any feature described in relation to any one embodiment may be used alone, or in combination with other features described, and may also be used in combination with one or more features of any other of the some embodiments, or any combination of any other of the some embodiments. Furthermore, equivalents and modifications not described above may also be employed without departing from the scope of the invention, which is defined in the accompanying claims.

What is claimed is:

1. A method of generating a list of applications available for installation on a user terminal, the method comprising:
   accessing a data store, the data store comprising entries for a plurality of applications and corresponding installation control settings associated with the plurality of applications;
   identifying, on the basis of user identification data associated with a user of a user terminal, a first installation control setting for a first application of the plurality of applications, wherein the first installation control setting is configured to control installation of the first application on the user terminal, and wherein the first installation control setting is associated with a first precedence value;
   identifying, on the basis of the user identification data associated with the user of the user terminal, a second installation control setting for the first application, wherein the second installation control setting is configured to control installation of the first application on the user terminal, and wherein the second installation control setting is associated with a second precedence value;
   determining installation control data for the first application on the basis of a comparison of the first precedence value associated with the first installation control setting and the second precedence value associated with the second installation control setting; and
   generating a list of applications available for installation on the user terminal based on the determined installation control data for the first application.

2. The method according to claim 1, wherein the first precedence value associated with the first installation control setting is associated with a first entity, and wherein the second precedence value associated with the second installation control setting is associated with a second entity.

3. The method according to claim 2, wherein the first entity and the second entity are different from the user of the user terminal.

4. The method according to claim 2, wherein at least one of the first entity and the second entity is an administrative entity.

5. The method according to claim 1, wherein the first installation control setting is associated with a first plurality of users, each of the first plurality of users having a first common grouping characteristic.

6. The method according to claim 5, wherein the second installation control setting is associated with a second plurality of users, at least some of which are different to the first plurality of users, each of the second plurality of users having a second common grouping characteristic, different from the first common grouping characteristic.

7. The method according to claim 1, wherein determining installation control data for the first application comprises selecting between the first installation control setting and the second installation control setting for the first application on the basis of the comparison of the first precedence value associated with the first installation control setting and the second precedence value associated with the second installation control setting.

8. The method according to claim 7, wherein selecting between the first installation control setting and the second installation control setting further comprises selecting a default installation control setting in the event that one of the first installation control setting and the second installation control setting comprises a default setting and the first precedence value and the second precedence value are equivalent.

9. The method according to claim 7, wherein selecting between the first installation control setting and the second installation control setting further comprises selecting whichever of the first installation control setting and the second installation setting results in a most restrictive installation control setting in the event that the first precedence value and the second precedence value are equivalent.

10. The method according to claim 1, wherein the first installation control setting and the second installation control setting each include at least one of:
 a setting allowing the user terminal to install the first application;
 a setting denying the user terminal a right to install the first application;
 a setting suspending access to the first application if previously installed;
 a setting continuing access to the first application if previously installed;
 a setting forcing the user terminal to install the first application; and
 a default installation control setting.

11. The method according to claim 1, wherein accessing the data store is responsive to receipt of a request for a list of applications available for installation on the user terminal from the user terminal.

12. The method according to claim 1, further comprising sending the list of applications available for installation on the user terminal to the user terminal.

13. A system for generating a list of applications available for installation on a user terminal, the system comprising:
 a data store, the data store comprising entries for a plurality of applications and corresponding installation control settings associated with the plurality of applications; and
 a processor communicatively coupled to the data store and configured to:
  access a data store, the data store comprising entries for a plurality of applications and corresponding installation control settings associated with the plurality of applications;
  identify, on the basis of user identification data associated with a user of a user terminal, a first installation control setting for a first application of the plurality of applications, wherein the first installation control setting is configured to control installation of the first application on the user terminal, and wherein the first installation control setting is associated with a first precedence value;
  identify, on the basis of the user identification data associated with the user of the user terminal, a second installation control setting for the first application, wherein the second installation control setting is configured to control installation of the first application on the user terminal, and wherein the second installation control setting is associated with a second precedence value;
  determine installation control data for the first application on the basis of a comparison of the first precedence value associated with the first installation control setting and the second precedence value associated with the second installation control setting; and
  generate a list of applications available for installation on the user terminal based on the determined installation control data for the first application.

14. The system of claim 13, wherein the first precedence value associated with the first installation control setting is associated with a first entity, and wherein the second precedence value associated with the second installation control setting is associated with a second entity.

15. The system of claim 13, wherein the first entity and the second entity are different from the user of the user terminal.

16. The system of claim 14, wherein at least one of the first entity or the second entity is an administrative entity.

17. A non-transitory, computer-readable medium comprising computer-executable instructions that, when executed by a processor in a computing device, cause the computing device to perform a method of generating a list of applications available for installation on a user terminal, the method comprising:
 accessing a data store, the data store comprising entries for a plurality of applications and corresponding installation control settings associated with the plurality of applications;
 identifying, on the basis of user identification data associated with a user of a user terminal, a first installation control setting for a first application of the plurality of applications, wherein the first installation control setting is configured to control installation of the first application on the user terminal, and wherein the first installation control setting is associated with a first precedence value;
 identifying, on the basis of the user identification data associated with the user of the user terminal, a second installation control setting for the first application, wherein the second installation control setting is configured to control installation of the first application on the user terminal, and wherein the second installation control setting is associated with a second precedence value;
 determining installation control data for the first application on the basis of a comparison of the first precedence value associated with the first installation control setting and the second precedence value associated with the second installation control setting; and
 generating a list of applications available for installation on the user terminal based on the determined installation control data for the first application.

18. The non-transitory, computer-readable medium of claim 17, wherein the first precedence value associated with the first installation control setting is associated with a first entity, and wherein the second precedence value associated with the second installation control setting is associated with a second entity.

19. The non-transitory, computer-readable medium of claim 18, wherein the first entity and the second entity are different from the user of the user terminal.

20. The non-transitory, computer-readable medium of claim 19, wherein at least one of the first entity or the second entity is an administrative entity.

* * * * *